US012347588B2

(12) United States Patent
Guo et al.

(10) Patent No.: US 12,347,588 B2
(45) Date of Patent: Jul. 1, 2025

(54) CABLE AND CABLE ASSEMBLY

(71) Applicant: Tyco Electronics (Shanghai) Co. Ltd, Shanghai (CN)

(72) Inventors: Zhiwei (Jack) Guo, Dongguan (CN); Hainan (Harlan) Lu, Dongguan (CN)

(73) Assignee: Tyco Electronics (Shanghai) Co., Ltd., Shanghai (CN)

(*) Notice: Subject to any disclaimer, the term of this patent is extended or adjusted under 35 U.S.C. 154(b) by 0 days.

(21) Appl. No.: 17/747,297

(22) Filed: May 18, 2022

(65) Prior Publication Data

US 2022/0375649 A1 Nov. 24, 2022

(30) Foreign Application Priority Data

May 21, 2021 (CN) ......................... 202110559521.0

(51) Int. Cl.
*H01B 7/18* (2006.01)
*H01B 11/00* (2006.01)

(52) U.S. Cl.
CPC ............. *H01B 7/18* (2013.01); *H01B 11/002* (2013.01)

(58) Field of Classification Search
CPC ... H01B 7/02; H01B 7/04; H01B 7/06; H01B 7/18; H01B 9/02; H01B 9/04; H01B 11/02; H01B 11/002; H01B 11/20; H01B 7/00; H01B 9/00
USPC ............. 174/102 R, 106 R, 108, 109, 110 R, 174/113 R, 117 R, 117 F
See application file for complete search history.

(56) References Cited

U.S. PATENT DOCUMENTS

| | | | | | |
|---|---|---|---|---|---|
| 3,032,604 | A * | 5/1962 | Timmons | H01B 11/1016 | 174/115 |
| 3,896,261 | A * | 7/1975 | Cole | H01B 13/225 | 174/115 |
| 5,037,999 | A * | 8/1991 | VanDeusen | H01B 11/1839 | 174/106 SC |
| 5,132,491 | A * | 7/1992 | Mulrooney | H01B 11/1826 | 174/106 SC |
| 5,486,649 | A * | 1/1996 | Gareis | H01B 11/1016 | 174/10 |
| 6,444,902 | B1 * | 9/2002 | Tsao | H01B 11/1091 | 174/117 F |
| 6,452,107 | B1 * | 9/2002 | Kebabjian | H01B 11/002 | 174/113 R |

(Continued)

FOREIGN PATENT DOCUMENTS

| | | | | |
|---|---|---|---|---|
| JP | 02-41332 U | * 3/1990 | | H01B 11/08 |
| JP | 2002-535841 | * 12/2002 | | H01B 11/00 |

*Primary Examiner* — William H. Mayo, III
(74) *Attorney, Agent, or Firm* — Barley Snyder

(57) ABSTRACT

A cable includes a pair of insulation core wires extending longitudinally parallel to each other, each of the insulation core wires has a central conductor and a core insulation layer circumferentially wrapped around the central conductor, an inner insulation layer wrapped on an outside of the core insulation layers of the insulation core wires to fix the insulation core wires, a metal shielding layer wrapped on an outside of the inner insulation layer, and an outer insulation layer wrapped on an outer circumferential surface of the metal shielding layer. The core insulation layers of the insulation core wires abut against each other on outer peripheries of first sides of the core insulation layers facing each other.

14 Claims, 1 Drawing Sheet

100

(56) References Cited

U.S. PATENT DOCUMENTS

| | | | | |
|---|---|---|---|---|
| 6,740,808 | B1 * | 5/2004 | Chang | H01B 7/0861 174/113 R |
| 6,803,518 | B2 * | 10/2004 | Chang | H01B 7/0861 333/1 |
| 7,514,632 | B2 * | 4/2009 | Lin | H01B 7/0823 174/117 F |
| 9,123,452 | B2 * | 9/2015 | Sugiyama | H01P 11/001 |
| 9,660,318 | B2 * | 5/2017 | Sugiyama | H01P 11/001 |
| 10,573,434 | B2 * | 2/2020 | Kobayashi | H01B 7/0225 |
| 2003/0146015 | A1 * | 8/2003 | Tanaka | H01B 11/1091 174/117 F |
| 2004/0026114 | A1 * | 2/2004 | Hsieh | H01B 7/0861 174/117 F |
| 2011/0083877 | A1 * | 4/2011 | Sugiyama | H01B 7/0823 427/117 |
| 2011/0315419 | A1 * | 12/2011 | Grant | H01B 11/06 174/34 |
| 2012/0024566 | A1 * | 2/2012 | Shimosawa | H01B 11/1091 174/107 |
| 2015/0000954 | A1 * | 1/2015 | Nonen | H01B 11/20 174/103 |

* cited by examiner

100
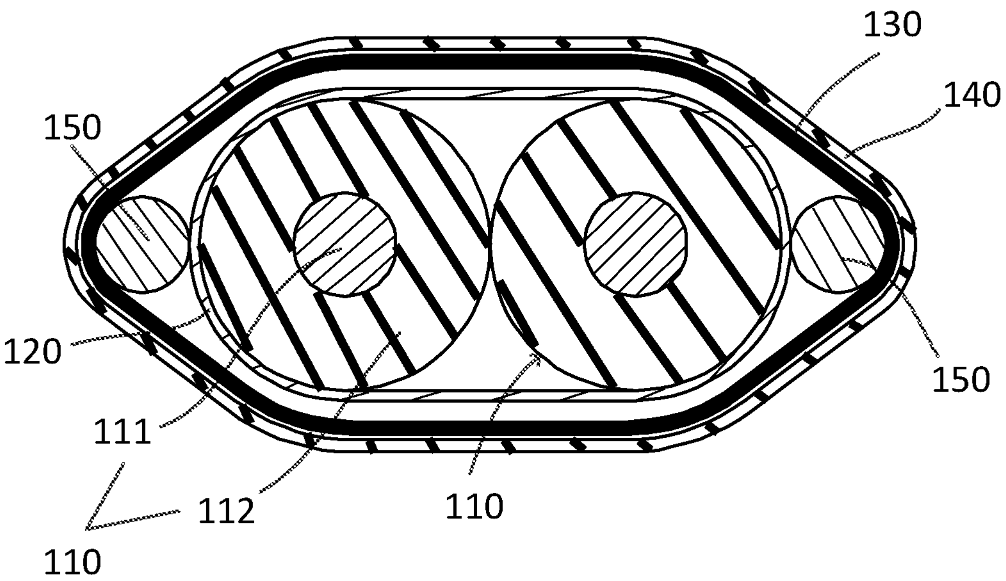

CABLE AND CABLE ASSEMBLY

CROSS-REFERENCE TO RELATED APPLICATIONS

This application claims the benefit of the filing date under 35 U.S.C. § 119(a)-(d) of Chinese Patent Application No. 202110559521.0, filed on May 21, 2021.

FIELD OF THE INVENTION

Embodiments of the present disclosure generally relate to a cable, and more particularly, to a cable and a cable assembly including the same, such as a twinaxial cable, that is capable of data transmission at high data transmission rates.

BACKGROUND

A conventional high-speed data transmission cable in structure mainly includes a pair of insulation core wires, a metal shielding layer wrapping around the insulation core wires, an insulation layer wrapping around the metal shielding layer, and a ground wire located between the metal shielding layer and the insulation layer. However, the high-frequency test bandwidth of this conventional structure is low and the electromagnetic shielding effect is poor. Moreover, during the bending process, the insulation core wire is easily displaced, negatively impacting the performance stability.

SUMMARY

A cable includes a pair of insulation core wires extending longitudinally parallel to each other, each of the insulation core wires has a central conductor and a core insulation layer circumferentially wrapped around the central conductor, an inner insulation layer wrapped on an outside of the core insulation layers of the insulation core wires to fix the insulation core wires, a metal shielding layer wrapped on an outside of the inner insulation layer, and an outer insulation layer wrapped on an outer circumferential surface of the metal shielding layer. The core insulation layers of the insulation core wires abut against each other on outer peripheries of first sides of the core insulation layers facing each other.

BRIEF DESCRIPTION OF THE DRAWING

The invention will now be described by way of example with reference to the accompanying FIGURE, of which:

FIG. 1 is a sectional view schematically showing a structure of a cable according to an exemplary embodiment.

DETAILED DESCRIPTION OF THE EMBODIMENTS

Embodiments of the present disclosure will be described hereinafter in detail taken in conjunction with the accompanying drawing. In the description, the same or similar parts are indicated by the same or similar reference numerals. The description of each of the embodiments of the present disclosure hereinafter with reference to the accompanying drawing is intended to explain the general inventive concept of the present disclosure and should not be construed as a limitation on the present disclosure.

In addition, in the following detailed description, for the sake of explanation, numerous specific details are set forth in order to provide a thorough understanding of the disclosed embodiments. It will be apparent, however, that one or more embodiments may also be practiced without these specific details. In other instances, well-known structures and devices are illustrated schematically in order to simplify the drawing.

As shown in FIG. 1, according to an exemplary embodiment of the present disclosure, there is provided a cable 100, which is, for example, as a biaxial or differential cable, for stable data transmission at a relatively high transmission rate, e.g., higher than 10 Gbps, such as in a range of 20 Gbps to 40 Gbps.

As shown in FIG. 1, the cable 100 according to an exemplary embodiment of the present disclosure includes a pair of insulation core wires 110 for signal or data transmission. The insulation core wires 110 of the pair are arranged to extend longitudinally parallel to each other, each of the insulation core wires 110 includes a central conductor 111 and a core insulation layer 112 circumferentially wrapped around the center conductor 111. For example, the core insulation layer 112 may be in the form of an insulating band and wound around the central conductor 111 in a longitudinal direction. The central conductor 111 may be made of high conductivity materials such as copper conductor and silver-plated conductor, and the core insulation layer 112 may be made of an insulation polymer material such as polyolefin.

As shown in FIG. 1, the cable 100 according to an exemplary embodiment of the present disclosure further includes an inner insulation layer 120 wrapped on an outside of the core insulation layers 112 of the pair of insulation core wires 110 (for example, partly wrapped on an outer circumferential surface of the core insulation layers 112), to fix the pair of insulation core wires 110, so that the core insulation layers 112 of the pair of insulation core wires 110 abut against each other on the outer peripheries surfaces of first sides thereof facing each other. Compared to the conventional cable, the insulation core wires 110 are fixed by wrapping the inner insulation layer 120 on the outside of the pair of insulation core wires 110, which ensures that the insulation core wires 110 in use, such as during bending, are not displaced, improving the performance stability of the cable.

In an embodiment, the inner insulation layer 120 can be in the form of an insulating tape, wound on the outside of the core insulation layer 112 of the pair of insulation core wires 110 in the longitudinal direction. In other embodiments, the inner insulation layer 120 can be bonded to a portion of the outer circumferential surface of the core insulation layer 112 of the pair of insulating core wires 110, for example, by thermal melting. In other embodiments, the inner insulation layer 120 may be bonded to a portion of the outer circumferential surface of the core insulation layer 112 of the pair of insulating core wires 110 by an adhesive. The inner insulation layer 120 is made of an insulation polymeric material. For example, the inner insulation layer 120 can be made of an insulation material such as polytetrafluoroethylene (PTFE), polyethylene terephthalate (referred to as "PET").

In some examples, fillers may be provided in a space between the core insulation layer 112 of the pair of insulation core wires 110 and the inner insulation layer 120, which provides the toughness of the cable 100 when the cable 100 is used during bending, and can further avoid displacement of the insulation core wires 110 in use.

As shown in FIG. 1, the cable 100 according to an exemplary embodiment of the present disclosure further includes a metal shielding layer 130 and an outer insulation layer 140. The metal shielding layer 130 is wrapped on an outside of the inner insulation layer 120, for shielding signals or data transmitted by the insulation core wires 110 from external electromagnetic interference, so as to provide an electromagnetic shielding effect. The outer insulation layer 140 is wrapped on an outer circumferential surface of the metal shielding layer 130.

For example, the metal shielding layer 130 can be in the form of a shielding tape and wound around the inner insulation layer 120 in the longitudinal direction. The outer insulation layer 140 is wrapped on the outer circumferential surface of the metal shielding layer 130. The outer insulation layer 140 may also be in the form of an insulation tape and wound around the metal shielding layer 130 in the longitudinal direction. The outer insulation layer 140 can be bonded to the outer circumferential surface of the metal shielding layer 130 by thermal melting or by an adhesive. The outer insulation layer 140 may be made of an insulation material such as polyester, polypropylene, polyethylene terephthalate (referred to as "PET"). In some examples, the outer insulation layer 140 may be formed by a stack of sub-insulation layers to enhance the toughness of the cable during bending.

For example, the metal shielding layer 130 may include a conductive layer that is partially bonded to the outer circumferential surface of the inner insulation layer 120 by an adhesive, or else, fillers are provided between the conductive layer 130 and the inner insulation layer 120, which improves the stable performance of the cable 100. As an example, the conductive layer of the metal shielding layer 130 is made of aluminum or copper, for example, it may be an aluminum/polypropylene band. However, in some other embodiments of the present disclosure, the conductive layer of the metal shielding layer 130 may also be made of other conductive materials.

In some embodiments, as shown in FIG. 1, the cable 100 further includes a ground wire 150, for example, provided between the inner insulation layer 120 and the metal shielding layer 130 in a manner such that the ground wire 150 is pressed by the metal shielding layer 130 against an outer circumferential surface of the inner insulation layer 120. In an embodiment, the ground wire 150 may be in electrical contact with the metal shielding layer 130 or its conductive layer.

FIG. 1 shows a situation where the ground wire 150 is located on outer side of the pair of insulation core wires 110 in a radial direction. In the embodiment shown in FIG. 1, the cable 100 may include two ground wires 150 located on opposite outer sides of the pair of insulation core wires 110 in a radial direction, respectively. In another embodiment of the present disclosure, the cable 100 may include one ground wire 150 located on a side of one insulation core wire of the pair of insulation core wires 110 away from the other insulation core wire in the radial direction. In an embodiment, centers of the central conductors 111 of the pair of insulation core wires 110 may be located in a same radial plane with a center of the ground wire 150, and the center of the ground wire 150 is located outside of the centers of central conductors 111 of the pair of insulation core wires 110 in the radial direction.

In some embodiments of the present disclosure, the metal shielding layer 130 may be adapted for an electrically grounding connection to external. For example, the cable 100 is not provided with a separate ground wire, and the metal shielding layer 130 may act as the function of the ground wire, so that a cable 100 with a more neat profile can be provided. As an example, the metal shielding layer 130 may be directly wrapped on the outer circumferential surface of the internal insulation layer 120, or there is an adhesive or a filler between the metal shielding layer 130 and the internal insulation layer 120.

According to embodiments of the present disclosure, there is also provided a cable assembly including at least two cables 100 mentioned herein, and these cables 100 may be provided within an outer sheath. For example, these cables 100 can be twisted with or wound on each other in the longitudinal direction, and the outer sheath can be in a form of a sleeve, such as metal or plastic sleeve, to provide certain protection.

According to the cable 100 and the cable assembly of the forgoing various exemplary embodiments of the present disclosure, high high-frequency test bandwidth and good electromagnetic shielding effect and good performance stability can be achieved.

Although some embodiments of the present disclosure have been shown and described, it would be appreciated by those skilled in the art that changes or modification may be made to these embodiments without departing from the principles and spirit of the present disclosure, the scope of which is defined in claims and their equivalents.

What is claimed is:

1. A cable, comprising:

a pair of insulation core wires extending longitudinally parallel to each other, each of the insulation core wires has a central conductor and a core insulation layer circumferentially wrapped around the central conductor;

an inner insulation layer wrapped on an outside of the core insulation layers of the insulation core wires to fix the insulation core wires, the core insulation layers of the insulation core wires abut against each other on outer peripheries of first sides of the core insulation layers facing each other;

a filler between the core insulation layers of the insulation core wires and the inner insulation layer, the filler fills a space between the core insulation layers and the inner insulation layer;

a metal shielding layer wrapped on an outside of the inner insulation layer and at least partially bonded to an outer circumferential surface of the inner insulation layer, the metal shielding layer is an aluminum/polypropylene band;

an outer insulation layer wrapped on an outer circumferential surface of the metal shielding layer;

a ground wire between the inner insulation layer and the metal shielding layer; and another filler between the metal shielding layer and the inner insulation layer, the another filler entirely fills a space between the metal shielding layer and the inner insulation layer around the ground wire.

2. The cable of claim 1, wherein the ground wire is pressed by the metal shielding layer against an outer circumferential surface of the inner insulation layer.

3. The cable of claim 1, wherein the ground wire is located on a side of one of the insulation core wires away from the other insulation core wire in a radial direction.

4. The cable of claim 1, further comprising a pair of ground wires on opposite outer sides of the insulation core wires in a radial direction.

5. The cable of claim 1, wherein a pair of centers of the central conductors of the insulation core wires are located in a same radial plane with a center of the ground wire.

6. The cable of claim 1, wherein the metal shielding layer forms an external electrically grounding connection.

7. The cable of claim 6, wherein the metal shielding layer is directly wrapped on an outer circumferential surface of the inner insulation layer.

8. The cable of claim 1, wherein the cable is an electrical cable for data transmission at a rate of 20 Gbps to 40 Gbps.

9. A cable assembly, comprising:

a pair of cables according to claim 1.

10. The cable of claim 1, wherein the inner insulation layer is an insulating tape.

11. The cable of claim 1, wherein the inner insulation layer is bonded to an outer circumferential surface of the core insulation layer of each of the insulation core wires.

12. The cable of claim 1, wherein the metal shielding layer is a shielding tape.

13. The cable of claim 1, wherein the outer insulation layer is an insulation tape.

14. The cable of claim 1, wherein the filler entirely fills the space between the core insulation layers and the inner insulation layer.

* * * * *